United States Patent Office 3,395,584
Patented Aug. 6, 1968

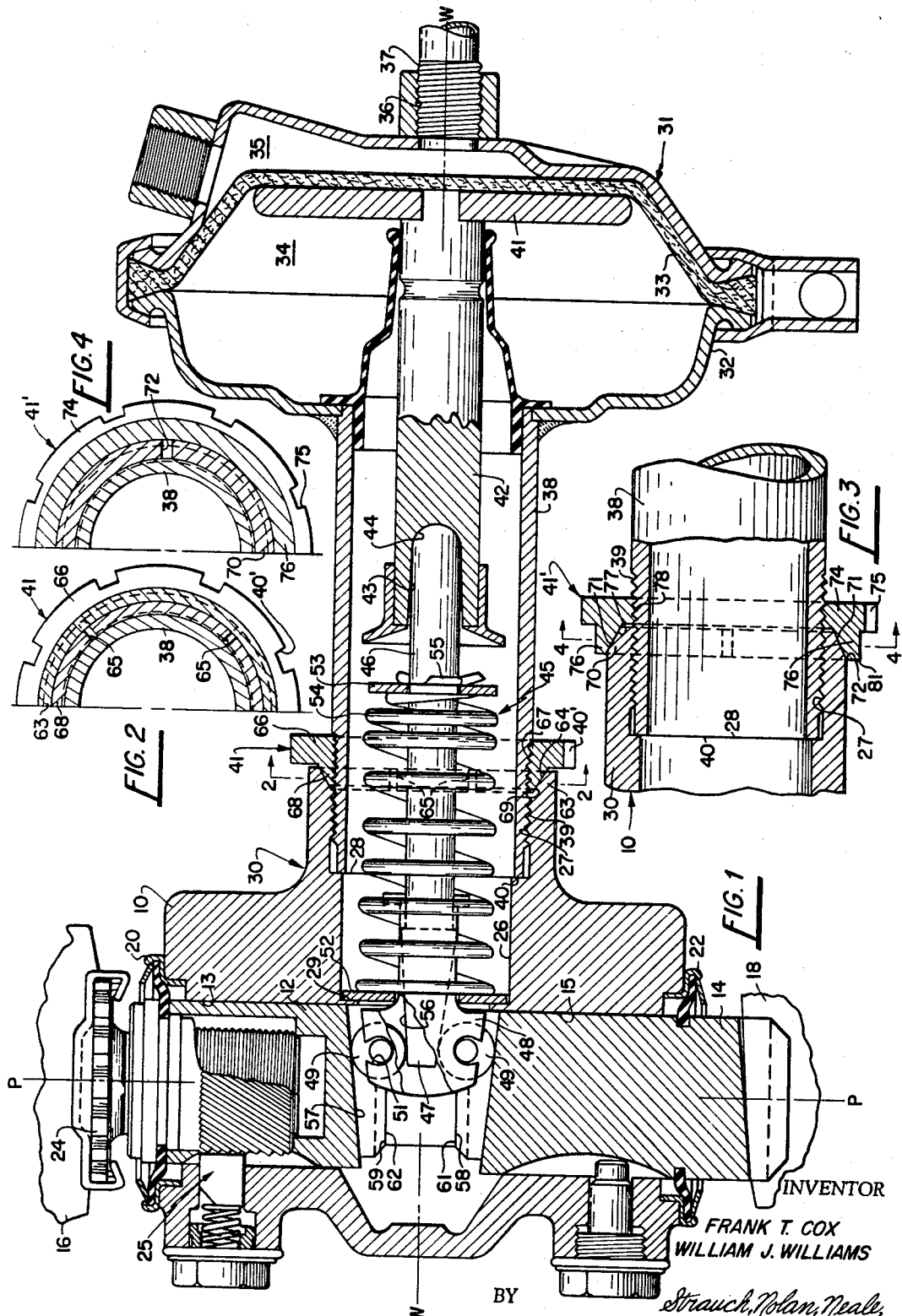

3,395,584
BRAKE ACTUATORS
Frank T. Cox and William J. Williams, Ashtabula, Ohio, assignors, by mesne assignments, to Rockwell-Standard Company, Pittsburgh, Pa., a corporation of Delaware
Filed Mar. 22, 1966, Ser. No. 536,384
11 Claims. (Cl. 74—110)

The present invention refers to vehicle brake actuators and more particularly to brake actuator and motor assemblies wherein the parts are automatically accurately operatively associated upon initial assembly.

The invention will be described in its preferred embodiment as incorporated in a brake assembly of the type disclosed in United States Letters Patent No. 3,037,584 issued June 5, 1962. In that brake the opposite ends of two brake shoes are operatively connected to slidable coaxial plungers in opposite transverse actuator housing bores. The actuator is a push rod with a wedge and roller assembly thereon that fits within appropriately inclined slots at the inner ends of the plungers so that, when the roller and wedge assembly is reciprocated in a direction normal to the direction of sliding of the plungers, the plungers will be oppositely displaced outwardly of the housing to cause the brake shoes to frictionally contact the surrounding relatively rotating brake drum.

Efficient trouble-free functioning of this type brake actuator mechanism requires that the wedge and roller assembly be correctly positioned in relation to the plungers. Prior to the invention, as disclosed in said United States Patent No. 3,037,584, the push rod for the wedge and roller assembly extends from the pressure responsive element of the motor through a tubular extension of the fluid pressure motor housing, and that extension is screwed into the plunger housing to extend at right angles to the axis of the plungers and midway between them so that the wedge and roller assembly is centralized in relation to the plungers and the axis of the motor housing. During initial assembly or during reassembly after servicing, the push rod and wedge and roller assembly, which may be a unitary sub-assembly, is properly located with respect to the plungers and the pressure responsive element of the motor by axial adjustment of motor housing in its threaded support on the actuator housing. This adjustment requires skill and special knowledge, and it is a major object of the present invention to provide a new mode of assembly whereby even unskilled labor may assemble the actuator mechanism accurately and lock it in such condition.

In the preferred embodiment of the invention, the tubular fluid pressure motor support with the fluid motor attached thereto is screwed into the actuator housing, with the push rod and wedge assembly in place, until it bottoms against a predeterminedly located abutment within the actuator housing bore. At this point, the wedge is in the proper starting position for the designated length of stroke to obtain maximum brake efficiency, and the diaphragm or other fluid pressure responsive element of the motor is positioned at its corresponding limit stroke location.

It is of paramount importance that during operation of the brake this initial correct operating position of the members be maintained so as not to reduce the stroke capacity and thus the efficiency of the brake. For this reason the tubular fluid motor support must be firmly locked against rotation and consequent axial displacement since, otherwise, vibration normally occurring in a travelling vehicle and brake reaction forces may cause the tubular support and motor housing to turn thus causing maladjustment. The locking arrangements for this purpose are a major part of the invention.

It is therefore a major object of the invention to provide a novel wedge type brake actuator and fluid pressure motor assembly wherein the actuator wedge is accurately located with respect to the brake shoe operating plungers by initial assembly and the parts are locked against accidental or undesirable change from this initial condition.

A further object of the invention is the provision of novel simplified locking means to lock the tubular fluid pressure motor support of a wedge type brake against accidental or undesired rotation in relation to the associated actuator housing to which it is threadedly attached.

A further object of the invention is to provide an assembly of two threadedly connected members, such as a brake actuator housing and a fluid pressure motor mounting tube, having novel means to prevent them from rotation relative to each other in the form of a locking ring threadedly mounted on the tube and a flexible interengaging lip connection, between the housing and the ring.

Further objects of the invention will appear from the following detailed description and claims and the accompanying drawings wherein:

FIGURE 1 is a section through a wedge operated brake assembly according to a preferred embodiment of the present invention;

FIGURE 2 is a half section substantially along line 2—2 of FIGURE 1 showing the flexible lip structure;

FIGURE 3 is an enlarged fragmentary view partly broken away and in section showing a further embodiment of the motor and housing connection; and FIGURE 4 is a half section substantially along line 4—4 of FIGURE 3.

FIGURE 1 shows a wedge brake actuator unit wherein the invention is embodied. An actuator housing 10 is preferably integral with or rigidly attached to a conventional brake spider or support (not shown). Actuator housing 10 contains oppositely disposed co-axial plungers 12 and 14 slidable in bores 13 and 15 and operatively connected at their outer ends to the opposite ends of brake shoes indicated at 16 and 18 respectively. Where the plungers project from housing 10, suitable seals 20 and 22 are provided to prevent the entrance of foreign matter into the housing and to retain the lubricant contained therein.

One or both plungers 12 and 14 may be longitudinally adjustable either manually or automatically to compensate for lining wear on the brake shoes 16 and 18. A rotatable star wheel 24 is shown associated with plunger 12 for manual adjustment of the effective length of the plunger. An automatic adjustment for the purpose is shown at 25. These adjustments are preferably the same as disclosed in United States Letters Patent No. 3,068,964 issued December 18, 1962.

In general, the mounting of housing 10 on its spider is much the same as disclosed in United States Letters Patent No. 3,037,584 issued June 5, 1962, to which reference is made for necessary further detail.

Housing 10 is formed with a side opening comprising an inner cylindrical bore 26 and a coaxial outer larger diameter internally threaded bore 27, there being a flat annular axially outwardly facing shoulder 28 at the bottom of bore 27. At the inner end of bore 26, opposed projections form diametrically opposite shoulder means at 29 within the opening for a purpose to appear. As shown, bore 26 preferably lies within the actuator body while bore 27 is disposed within a projecting hollow boss 30. The common axis of bores 26 and 37 indicated at W—W is at right angles to the common axes of the plunger bores P—P. Shoulders 28 and 29 lie in parallel planes at right angles to axis W—W.

A fluid pressure motor assembly 31 is composed of a multipart sheet metal casing 32 within which is peripherally clamped a flexible diaphragm 33 that defines fluid pressure chambers 34 and 35 at opposite sides thereof. The wall of casing 32 is formed with a threaded aperture 36 for connection of chamber 35 to a fluid pressure supply line 37 leading to the usual air pressure reservoir. Casing 32 is provided with a rigid hollow mounting tube 38 externally threaded at 39 to be mounted in housing bore 27 and terminating in a flat end face 40 abutting housing shoulder 28. A locking ring 41 of special characteristics, as will appear, is mounted on threads 39 and tightened into abutment with the end of boss 30.

Abutting the center of diaphragm 33 is a rigid disc 41 to which is secured one end of a rod 42 that has its other end formed with a socket 43 having a spherical contour bottom 44.

A wedge assembly cartridge 45 consists essentially of a rod 46 having an integral wedge 47, a floating roller carrier 48, rollers 49 mounted in carrier slots 51, axially spaced washers 52 and 53 with a compression spring 54 between them surrounding the wedge and rod, and a fastener such as cotter key 55 extending through rod 46 adjacent washer 53; and this wedge assembly comprises a motion transmitting unit interposed between the diaphragm and the plungers.

As shown in FIGURE 1, in the assembly the end of rod 46 opposite wedge 47 is formed to seat in recess 43, and rollers 49 are disposed to extend between the opposite inclined sides 56 of wedge 47 and similarly inclined plungers inner end slot surfaces 57. Surfaces 57 lie at the bottom of plunger end slots wide enough to receive the rollers.

Interiorly, housing 10 is formed with parallel anchor faces 58 and 59 which are adapted to be abutted by the plunger inner ends 61 and 62 respectively during normal operation, depending upon the direction of movement of the vehicle when the brake is applied.

In the assembly of FIGURE 1, washer 52 of the wedge unit seats on body shoulder 29, and preferably washer 52 is non-rotatable with respect to bore 26 and has a rectangular wedge passing aperture, to assure that when the wedge unit 45 is mounted in the assembly the wedge and rollers 49 are properly oriented with respect to the inner ends of plungers 12 and 14.

Washer 52 and its non-rotatable mounting in bore 26 and its cooperation with the wedge may be the same as disclosed in co-pending Serial No. 368,903 filed May 20, 1964 now United States Letters Patent No. 3,302,473 issued February 7, 1967. The structure and cooperation of the wedge, the floating carrier 48, the rollers 49 and the inner ends of the plungers is preferably the same as disclosed in said Letters Patent No. 3,037,584.

During assembly, the tube 38 is inserted into bore 27, the wedge assembly cartridge unit 45 being disposed in place with the end of rod 46 seated in diaphragm rod recess 43. Washer 52 is guided into bore 26 and seats on shoulder 29, and the wedge 47 and rollers 49 extend between the slotted inner ends of opposed plungers 12 and 14. Casing 31 is rotated until the flat end 40 of tube 38 firmly abuts actuator shoulder 28 in a plane that is fixedly spaced from plunger axis P—P as well as from the bottomed position of the diaphragm 33 shown in FIGURE 1.

At this time the parts are disposed as shown in FIGURE 1, and the dimensions of the parts are such that the wedge 47 and rollers 49 are properly located in optimum initial position between the inner ends of plungers 12 and 14 with the diaphragm 33 bottomed in chamber 35 at its limit of stroke in brake disengaged direction. The plungers 12 and 14 at this time are both urged inwardly against the anchor surfaces by the usual brake shoe return springs.

It will be observed that once washer 52 has seated on shoulder 29 further axial inward movement of tube 38 as the casing 31 is rotated compresses spring 54 and results in the wedge and its associated carrier and roller assembly being projected further into the space between the plungers and away from washer 52, whereby roller carrier 48, which in the cartridge was held against the wedge in relatively immovable condition by spring 54 and washer 52, is now free of washer 52 and is disposed in its operative floating condition on the wedge to function as described in said Letters Patent No. 3,037,584. Relative rotation of the wedge assembly 45 and the motor is permitted by the rotative fit of rod 46 in recess 43.

The special structure at lock ring 41 will now be described. At its outer open end, bore 27 is internally chamfered to provide a lip 63 having an axially outwardly facing annular inclined surface 64.

Lock ring 41 comprises an annulus 66 internally threaded at 67 and having an annular projecting lip 68 formed externally with a smooth annular axially facing surface 69 which is inclined at about the same angle as surface 64. Lip 68 is formed with a plurality of equally circumferentially spaced slots 65 that effectively divide it into a number of arcuate sections and provide a flexible lip structure. When ring 41 is drawn tight, as by a wrench engaging its periphery 40', flexible lip 68 enters bore 27 and engages housing lip 63 with a resilient tight fit that effectively locks ring 41 non-rotatably to the actuator housing and assures a permanent assembly. This locking action is improved where the locking ring sections between slots 65 are forced to bend inwardly as surfaces 64 and 69 engage under pressure to be crimped against the tube threads 39. As lock ring 41 is rotated tube 38 remains in abutment with the housing shoulder. The direction of rotation of ring 41 is advancing into flexible lip interlock with the housing is the same as the direction that tube 38 is rotated to enter bore 27, so that the foregoing rotation of ring 41 aids in maintaining the abutment of tube 38 with shoulder 28. If desired the conical diameter of surface 69 may be slightly larger than that of lip surface 64 for a tighter fit. In any event ring 41 is simply drawn adequately tight and no special skill is needed for the assembly.

FIGURES 3 and 4 illustrate a further embodiment of the invention wherein the structure of the lock ring is substantially the reverse of that in FIGURES 1 and 2. In this embodiment, the end of housing boss 30 is formed with an external chamfer providing a lip 70 having an external axially facing inclined surface 71, and housing lip 70 is axially split by a plurality of slots 72 that are equally spaced circumferentially and render lip 70 flexible.

Lock ring 41' comprises a solid annulus 74 formed about its periphery with wrench receiving formations 75 and having at one side a solid projecting annular lip 76 formed with an internal inclined annular surface 77 of substantially the same inclination as surface 71. Annulus 74 is internally threaded at 78.

Assembly is made in the FIGURES 3 and 4 embodiment as in that of FIGURES 1 and 2, tube 38 being turned into bore 27 until its end 40 seats on shoulder 28, and then ring 41' is drawn tight, with flexible lip 70 being resiliently contracted by outer lip 76 to tightly grip threads 27 and thereby lock ring 41' non-rotatably to the actuator housing.

The invention therefore provides a novel mode of assembling wedge assembly and fluid pressure motor on the actuator housing whereby the wedge is accurately located in initial brake disengaged position between the brake shoe engaging plungers and the motor diaphragm is bottomed within the motor casing 31 in its limit brake disengaged position. No adjustments or special skill of workmen is needed to make the assembly. All that is necessary is to turn the motor casing until tube 38 abuts shoulder 28, and then tighten the locking ring.

The invention may be applied to other forms of wedge type brakes having different structural associations of wedge rollers and plunger ends without departing from the spirit thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a brake assembly of the type wherein a reciprocable wedge actuator projects into an actuator housing member containing two oppositely slidable brake shoe associated plungers disposed in aligned bores having a common axis and a fluid pressure motor has a tubular casing extension member threadedly coupled with said housing member with said wedge actuator extending through said casing extension member between a fluid pressure responsive element of said motor and the inner ends of said plungers, said housing member having a threaded bore into which the threaded end of said casing extension member extends, the improvement that comprises an axially outwardly facing abutment within said threaded bore against which the end of said casing extension member is firmly seated in a plane disposed at a fixed distance from the axis of reciprocation of said plungers, and means for non-rotatably securing said casing extension member to said actuator housing member.

2. In the brake assembly defined in claim 1, said abutment comprising an annular flat shoulder within said threaded bore and said casing extension member having a corresponding flat end axially engaged with said shoulder.

3. In the brake assembly defined in claim 1, said housing member having an inclined surface end lip in surrounding relation to the threaded end of said casing extension member, and said securing means comprising a locking ring threadedly mounted on said casing extension member and having an inclined surface end lip in tight engagement with said housing member lip, one of said lips being axially split so as to be flexible and being disposed radially between the threads of said casing extension member and the inclined surface of the other lip whereby when said locking ring is tightened said flexible lip is contracted about said threaded end of the casing extension member.

4. In the brake assembly defined in claim 1, said fluid pressure responsive element comprising a flexible diaphragm within the motor casing having a central socket to rotatably receive one end of said wedge actuator and said wedge actuator comprising a rigid rod having one end disposed in said socket and the other end in wedge form and mounting antifriction means between the plunger inner ends and opposite sides of the wedge, said parts being so constructed and arranged that when said casing extension member end engages said housing member abutment in initial assembly with the brakes disengaged the wedge and rollers are correctly operatively positioned between said plunger inner ends and said diaphragm is bottomed in its limited stroke brake disengagement position within the motor casing.

5. In the brake assembly defined in claim 1, said wedge actuator comprising a rod having a wedge at one end, a roller carrier mounted on said rod and extending along the wedge to mount antifriction rollers on opposite sides of the wedge, a washer slidably mounted on the rod adjacent said carrier, and a spring surrounding the rod compressed between an abutment on the rod and said washer, and said housing member has a further bore inwardly of said threaded bore provided with axially outwardly facing shoulder means, said washer being axially seated on said shoulder means in the assembly and said abutment being located axially between said threaded and further bores.

6. In the brake assembly defined in claim 1, said securing means comprising a locking ring rotatably threadedly mounted on said casing extension member, and said ring and said housing member having axially interengaging inclined surface lip means.

7. In the brake assembly defined in claim 6, said lip means comprising interfitting axially projecting lips on said locking ring and housing member, with one of said lips being flexible.

8. In the brake assembly defined in claim 7, said flexible lip being an axially split annulus.

9. In the brake assembly defined in claim 1, said housing member having a first inclined surface lip projecting at the outer end of said bore, and said securing means comprising a locking ring threadedly rotatable on said casing extension member and having an axially projecting second lip provided with an inclined surface matching and engaging that of the first lip.

10. In the brake assembly defined in claim 9, said housing having a hollow side boss wherein said threaded bore is formed, with said abutment being an axially facing shoulder at the inner end of said threaded bore, and said lip surfaces engaging in a substantially conical interface at the outer end of said threaded bore.

11. In the brake assembly defined in claim 10, at least one of said lips being axially slotted so as to be flexible.

References Cited

UNITED STATES PATENTS

| | | | |
|---|---|---|---|
| 3,037,584 | 6/1962 | Cox et al. | 188—78 |
| 3,139,762 | 7/1964 | Alfieri | 74—110 |
| 3,227,247 | 1/1966 | Sherretts et al. | 188—196 |
| 3,302,473 | 2/1967 | Lowry et al. | 74—110 |
| 3,322,241 | 5/1967 | Cox et al. | 188—152.85 |

FRED C. MATTERN, Jr., *Primary Examiner.*

F. D. SHOEMAKER, *Assistant Examiner.*